United States Patent Office 3,260,764
Patented July 12, 1966

3,260,764
**TRANSMETHYLATION AND DISPROPORTIONA-
TION OF AROMATICS**
Stephen M. Kovach, Highland, Ind., and Glenn O. Michaels, Park Forest, Ill., assignors to Sinclair Research, Inc., Wilmington, Del., a corporation of Delaware
No Drawing. Filed Jan. 5, 1962, Ser. No. 164,601
The portion of the term of the patent subsequent to Feb. 2, 1982, has been disclaimed
8 Claims. (Cl. 260—672)

This invention relates to the treatment of alkylaromatic hydrocarbons and is particularly concerned with a catalytic process for the transalkylation-disproportionation-isomerization of polyalkyl aromatics, e.g. polyalkyl benzenes, employing a hydrocarbon conversion catalyst consisting essentially of chromia and boria on an alumina catalytic support.

Alkyl aromatics, such as alkyl benzenes are used by the chemical industry as intermediates in the preparation of resins, plastics and diverse chemicals such as aldehydes, alcohols, carboxylic acids, etc. For instance, durene (1,2,4,5-tetramethylbenzene) is a chemical which is of particular utility as an intermediate in preparing various plastics, resins, synthetic filaments and other products. Also, the lower molecular weight symmetrical 1,3,5-trialkylbenzenes are highly desired for oxidation to aromatic polycarboxylic acids which are useful in the production of alkyd type resins, plastics and plasticizers. The symmetrical 1,3,5-trimethylbenzene (mesitylene) has an extremely high clear CFR-R octane number. Its blending octane number is among the highest of any pure hydrocarbon tested in contrast with other known blending aromatics such as cumene and the ortho-, meta-, and paraxylenes.

A number of reactions of the alkyl benzene molecule may be effected. The alkyl substituents may be shifted along the benzene ring, i.e. transalkylation; or the alkyl substituent may be shifted from one alkyl benzene molecule to another, i.e. disproportionation; or interaction of alkyl benzenes, for instance, the dealkylation of some molecules with further alkylation of others.

The use of catalysts for the transalkylation-disproportionation of low molecular weight polyalkylbenzenes has long been known and many catalysts have been suggested for these processes. In such processes, the catalyst usually suffered from a defect either of being insufficiently active to promote the transalkylation disproportionation reaction or if sufficiently active, of too short a life to be of commercial interest. Silica-alumina, synthetic and natural, commercial cracking catalysts and boria-alumina have been previously suggested for the transalkylation-disproportionation reaction and while they are very good with respect to yield, they too have a very short life and require frequent regeneration because of the high production of coke which becomes deposited on the catalyst. The presence of hydrogen reduces carbon laydown on the catalyst but not sufficient to increase catalyst activity appreciably. In a short period, i.e. about 4 to 8 hours, transmethylation activities decrease rapidly.

In accordance with the present invention, it has been found that when employing a catalyst consisting essentially of chromia and boria on an alumina support and hydrogen as a diluent, excellent transmethylation-disproportionation properties, lower carbon laydown on the catalyst and longer cycle time before regeneration have resulted.

Transalkylation-disproportionation is accomplished in the present process by employing a particularly effective catalyst which includes chromia in catalytic amounts generally from about 1 to 20, preferably from about 5 to 15 weight percent; boria in catalytic amounts generally from about 1 to 20, preferably from about 1 to 10 weight percent on an alumina support. The natural or synthetic aluminas can be employed as the inert carrier of the catalyst but a highly-preferred base is an activated or gamma alumia such as those derived by calcination of amorphous hydrous alumina, alumina monohydrate, alumina trihydrate or their mixtures.

Activated or gamma alumina is made by calcining a precursor predominating in alumina trihydrate. An alumina of this type is disclosed in U.S. Patent No. 2,838,444. The alumina base is derived from a precursor alumina hydrate composition containing about 65 to 95 weight percent of one or more of the alumina trihydrate forms, gibbsite, bayerite I and bayerite II (randomite) as defined by X-ray diffraction analysis. The substantial balance of the hydrate is amorphous hydrous or monohydrate alumina. Trihydrates are present as well-defined crystallites, that is, they are crystalline in form when examined by X-ray diffraction means. The crystallite size of the precursor alumina trihydrate is relatively large and usually is in the 100 to 1000 Angstrom unit range. The calcined alumina has a large portion of its pore volume in the pore size range of about 100 to 1000 Angstrom units generally having about 0.1 to about 0.5 volume in this range. As described in the patent the calcined catalyst base can be characterized by large surface area ranging from about 350 to about 550 or more square meters/gram when in the virgin state as determined, for example, by the BET adsorption technique. A low area catalyst base prepared by treating the predominantly trihydrate base precursor is described in U.S. Patent No. 2,838,445. This base when in the virgin state has substantially no pores of radius less than about 10 Angstrom units and the surface area of the catalyst base is less than about 350 square meters/gram and most advantageously is in the range of about 150 to 300 square meters/gram. The alumina base can contain small amounts of other solid oxides such as silica, magnesia, natural or activated clays (such as kaolinite, montmorillonite, halloysite, etc.), titania, zirconia, etc. The total amount of such promoters generally not exceeding about 20 percent by weight for instance about 0.1 to 10 weight percent.

The metal components can be added to the alumina catalytic support by known procedures involving impregnation using a water soluble salt of the catalytic component or by precipitation or co-precipitation. The support can be impregnated with the active oxides simultaneously or singly in any order.

The boria can be added to the catalyst in any stage of its preparation. It may be incorporated in the support, for instance, by precipitation, coprecipitation, impregnation, and mulling either before or after the addition of the chromia. It can also be applied by impregnation from solution (water, organic or inorganic solvents) or from a gas phase. However, it is frequently added to the catalyst after it has been formed by tableting or extrusion and calcined.

The chromia component of the catalyst of the present invention is added to the base in catalytic amounts by known procedures involving impregnation or coprecipitation. Suitable water-soluble compounds include chromium nitrate, chromic acid, chromic sulfate and chromium chloride, but the nitrates have the advantage that they decompose to the oxides after calcination without leaving a residue which is difficult to wash out. When employing the impregnation procedure the resulting impregnated product is dried generally at a temperature within the range of about 170° F. to 400° F. for at least 6 hours and up to 24 hours or more with a stream of air circulated to carry off the water vapor. The dried catalyst mixture then may be formed by a tabletting or extruding operation. If the catalyst is to be in finely divided form, a grinding operation may follow drying. In the case of tabletting, it is customary to incorporate a die lubricant which advantageously is organic and can be burned out by oxidation in the calcination step.

The dried pellets are suitable for subjection to high temperature treatment or calcination at a temperature between about 500° F. and about 1500° F., usually between about 700° F. and 1000 F., for instance, for a period of between about 2 and about 36 hours. It is generally preferred that the calcining operation be conducted in a manner minimizing contact time of the alumina-containing product with water vapor at the high temperatures encountered. The product after drying generally contains a substantial amount of water which is driven off at temperatures above about 400° F. It is usually preferred to heat the alumina-containing composite at a rate of 2 to 20° F. per minute up to about 600° F. with an air flow through the catalyst bed followed by heating at a slower rate to the final calcination temperature within the range of about 700° F. to 1500° F. especially if an organic die lubricant is to be oxidized without localized overheating. While the calcination or heat treatment will generally be conducted in air, it is also feasible, although generally less desirable, to carry out the same in other oxidizing atmospheres, a reducing atmosphere such as for example, hydrogen or methane, or an inert atmosphere, such as nitrogen. In some instances, it may be desirable to carry out the calcination initially in a blend of air and nitrogen. The alumina impregnated with the catalytically active components, is finally cooled to yield the finished product.

The alumina based catalyst can be activated during processing on stream, it can be pre-reduced or pre-activated. Pre-activation can be accomplished by treatment with hydrogen at an elevated temperature, for instance, about 800 to 1000° F. The catalyst employed in the process of the present invention can be easily regenerated employing conventional procedures, for instance by subjecting it to an oxygen-containing gas at temperatures sufficient to burn off carbon deposited on the catalyst during the alkylation. This oxygen-containing gas. e.g. an oxygen-nitrogen mixture, can contain about 0.01 weight percent to 5 weight percent oxygen but preferably contains about 0.5 to 1.5 weight percent oxygen and is introduced at a flow rate such that the maximum temperature at the site of combustion is below about 1000° F.

The feed to the instant process comprises complex mixtures which include any polyalkylated mono- and polycyclic aromatic hydrocarbons such as xylenes, trimethyl-, tetramethyl, pentamethyl- and hexamethylbenzenes, polyethyl benzenes, ethyl toluenes and ethyl xylenes, polypropyl and polybutyl benzenes as well as the analogous polynuclear derivatives such as polymethyl naphthalenes and anthracenes. The compounds may correspond to the general formula:

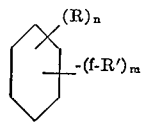

where R is an alkyl, including cyclo alkyl, radical containing generally from about 1 to 20, preferably from about 1 to 8 carbon atoms and where n is preferably 2 or more, R need not be the same alkyl group; n is 2 to 6; R' is an aromatic hydrocarbon ring, preferably $C_4H_4$; -f- indicates a fused ring relationship (two carbon atoms common to two aromatic nuclei, e.g. as in naphthalene); and m is generally 0 to 1 or more. The preferred aromatics, however, include alkyl benzenes corresponding to the above formula when m is 0 and n is 2 or more; however benzene and toluene may be present but for economical reasons, they are usually excluded from the feed.

The aromatic rings and R groups may be substituted as with phenyl, hydroxy, alkoxy, halide and other radicals which do not prevent the desired reaction. Suitable aromatic hydrocarbons include ortho-xylene, meta-xylene, para-xylene, ortho-ethyltoluene, meta-ethyltoluene, para-ethyltoluene, 1,2,3-trimethyl benzene, 1,2,4-trimethyl-benzene, 1,3,5-trimethylbenzene or mesitylene. Higher molecular weight alkyl-aromatic hydrocarbons are also suitable as starting materials and include aromatic hydrocarbons such as are produced by the alkylation of aromatic hydrocarbons with olefin polymers. Such products are frequently referred to in the art as alkylate, and include hexyltoluene, nonyltoluene, dodecyltoluene, pentadecyltoluene, etc. Preferably the feedstock of the present invention should be a polymethylbenzene feedstock which is preferably substantially free from olefinic components.

In accordance with this invention the feedstock containing the desired polyalkyl aromatic components, along with added hydrogen in the amount of hydrogen to polyalkyl aromatic feed in the mole ratios of from 1 to about 20:1 or more, preferably from about 1 to 10:1, is contacted with the chromia-boria-alumina catalyst at temperatures between about 400 to 1000° F., preferably about 500 to 900° F. while the pressure may range from about ambient pressures or less up to about 2000 p.s.i.g., preferably from about 0 to 1000 p.s.i.g. The catalyst can be used as a fixed, moving or fluidized bed or in any other convenient type of handling system. The aromatic space velocity will in most cases be from about 0.05 to 20, preferably from about 0.1 to 10, weights of aromatic per weight of catalyst per hour (WHSV).

The following specific examples will serve to illustrate the present invention but are not to be considered as limiting.

PREPARTION OF CATALYST 1500 grams of a calcined alumina support having a hydrate composition comprising about 42% bayerite, 18% randomite, 11% gibbsite, 20% boehmite, and 9% amorphorus as determined by X-ray diffraction analysis, are added into a 6″ crystallizing dish. 334 grams of $H_3BO_3$ and 247 grams of $CrO_3$ are dissolved in 1400 ml. of distilled water at 194° F. and poured over the pellets and stirred thoroughly. The mixture is dried at 194° F. and then calcined for 2 hours in a muffle furnace at a temperature of about 1000° F. The calcined catalyst contains about 10% by weight of boria ($B_2O_3$) and 10% by weight of chromia ($Cr_2O_3$), based on the alumina.

The examples are conducted according to the following procedure. A 1-inch internal diameter Universal stainless steel reactor heated by radiant heat and bronze-block furnace are employed. The temperature of the reactor is controlled by Fenwall thermostats and the temperature of the catalyst bed is measured by means of iron-constantan thermocouples located throughout the bed.

*Example 1*

2 moles of ortho-xylene and 1 mole of pentamethylbenzene are charged to the reactor from a graduated blowcase by hydrogen (diluent gas) placement. Both the diluent gas and the liquid feed are metered to the reactor through Fisher-Porter rotameters.

On leaving the reaction zone the effluent stream is first freed of hydrogen and similar light gases and is thereafter subjected to one or more distillation operations to recover a fraction rich in 1,3,5-trimethylbenzene produced in the transmethylation-disproportionation reaction. The fraction rich is isomers of tetramethylbenzene which may be further treated to recover durene (1,2,4,5-tetramethylbenzene) such as, for instance, by crystallization methods well known in the art, or other desired aromatic tetraalkylbenzenes produced. The volume of dry gas is measured by means of a wet test meter and spot and continuous gas samples are taken. The gas samples are analyzed by mass spectrometer techniques. Total hydrocarbon analyses are by a vapor phase chromatography. Example I is conducted under the conditions specified in Table I. Also, Table I gives a comparison of silica-alumina, boria-alumina and boria-chromia-alumina and the effect of hydrogen as a diluent on the transalkylation-disproportionation reaction.

TABLE I

| Run No. | 1 | 2 | 3 | 4 | 5 |
|---|---|---|---|---|---|
| Catalyst | Houdry SiO$_2$—Al$_2$O$_3$ | | 10% B$_2$O$_3$—Al$_2$O$_3$ | | 10% Cr$_2$O$_3$ 10% B$_2$O$_3$ on Al$_2$O$_3$ |
| Time—Hours | 4 | 4 | 4 | 4 | 4 |
| Conditions: | | | | | |
| Temperature, °F | 700 | 700 | 700 | 700 | 700 |
| Pressure, p.s.i.g | 100 | 200 | 100 | 200 | 400 |
| WHSV | .25 | .25 | .25 | .25 | .26 |
| Diluent—Mole Ratio | None | H$_2$—3/1 | None | H$_2$—3/1 | H$_2$—7/1 |
| Percent of Theory: | | | | | |
| Disproportionation | 95 | 96 | 91 | 90 | 95 |
| Isomerization C$_9$(1,3,5-TMB) | 111 | 114 | 114 | 115 | 94 |
| Carbon on Catalyst—Wt. Percent | 2.7 | 1.9 | 7.3 | 2.7 | <.05 |

The conventional silica-alumina cracking catalyst and boria-alumina have excellent properties for the transmethylation-disproportionation of the high molecular weight alkylbenzenes to the lower molecular homologues, however, these results are obtained with a high coking rate (Runs 1 and 3). Employing hydrogen as a diluent with these conventional catalysts reduced carbon laydown on the catalyst but not to an appreciable extent (Runs 2 and 4). This catalyst fouling means short cycle life requiring frequent regeneration even though disproportionation and transmethylation have not dropped to a low level. However, when boria and chromia are incorporated upon a calcined alumina support high disproportionation and transmethylation are maintained and a significantly lower coking rate is obtained. This lower coking rate significantly enhances the aging characteristics of the catalyst with subsequent long cycle time before requiring regeneration.

It is claimed:
1. A process for treating polyalkyl aromatics which comprises contacting a polyalkyl aromatic feedstock under transmethylation and disproportionation conditions at a temperature between about 400 to 1000° F. and in the presence of a catalyst consisting essentially of about 1 to 20 weight percent boria, about 1 to 20 weight percent chromia on a calcined alumina base.

2. The process of claim 1 wherein the polyalkyl-aromatic corresponds to the structural formula:

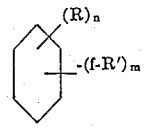

where R is an alkyl radical containing from about 1 to 8 carbon atoms; $n$ is 2 to 6; R′ is an aromatic hydrocarbon ring; $m$ is 0 to 1 and -f- indicates a fused ring relationship.

3. The process of claim 2 wherein the polyalkylaromatic feedstock comprises a mixture of polymethylbenzenes of more than 10 carbon atoms and less than 10 carbon atoms.

4. The process of claim 3 wherein the polyalkylaromatic feedstock comprises a mixture containing pentamethylbenzene and orthoxylene.

5. The process of claim 1 wherein the reaction is carried out in the presence of added free hydrogen.

6. The process of claim 5 wherein the amount of hydrogen to polyalkyl aromatic feed is in a mole ratio of from about 1:1 to about 10:1.

7. The process of claim 1 wherein the catalyst consists essentially of about 1 to 10 weight percent boria, and about 5 to 15 weight percent chromia on a calcined alumina base.

8. The process of claim 7 wherein the catalyst is calcined at a temperature between about 500° F. and about 1500° F. for a period of between about 2 to 36 hours.

References Cited by the Examiner

UNITED STATES PATENTS

| 2,383,179 | 8/1945 | Egloff | 260—671 |
| 2,389,713 | 11/1945 | Atwell | 260—672 |
| 2,774,801 | 12/1956 | Coonradt et al. | 260—672 |
| 3,168,583 | 2/1965 | Kovach | 260—672 |

DELBERT E. GANTZ, *Primary Examiner.*

ALPHONSO D. SULLIVAN, *Examiner.*

J. E. DEMPSEY, C. R. DAVIS, *Assistant Examiners.*